(12) United States Patent　　　　(10) Patent No.: US 12,651,410 B2

Rajasekaran　　　　　　　　　　　(45) Date of Patent: Jun. 9, 2026

(54) PARTS-BASED DECOMPOSITION OF HUMAN BODY FOR BLEND SHAPE PIPELINE INTEGRATION AND MUSCLE PRIOR CREATION

(71) Applicants: SONY GROUP CORPORATION, Tokyo (JP); Sony Corporation of America, New York, NY (US)

(72) Inventor: Suren Deepak Rajasekaran, Milpitas, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 190 days.

(21) Appl. No.: 18/522,577

(22) Filed: Nov. 29, 2023

(65) Prior Publication Data

US 2024/0331295 A1　　Oct. 3, 2024

Related U.S. Application Data

(60) Provisional application No. 63/493,391, filed on Mar. 31, 2023.

(51) Int. Cl.
*G06T 17/20* (2006.01)
*G06T 7/149* (2017.01)
*G06V 40/20* (2022.01)

(52) U.S. Cl.
CPC .............. *G06T 17/20* (2013.01); *G06T 7/149* (2017.01); *G06V 40/23* (2022.01)

(58) Field of Classification Search
None
See application file for complete search history.

(56)　　　　　References Cited

U.S. PATENT DOCUMENTS

| | | | |
|---|---|---|---|
| 10,529,137 B1 * | 1/2020 | Black | G06T 15/04 |
| 11,158,121 B1 * | 10/2021 | Tung | G06N 3/0442 |
| 11,270,487 B1 * | 3/2022 | Steptoe | G06V 40/171 |
| 11,380,043 B2 * | 7/2022 | Holladay | G06T 17/10 |
| 2008/0198161 A1 * | 8/2008 | Schiwietz | G06T 17/20 |
| | | | 345/424 |
| 2010/0111370 A1 * | 5/2010 | Black | G06F 18/2321 |
| | | | 705/26.1 |
| 2010/0268063 A1 * | 10/2010 | Schmidt | G01R 33/481 |
| | | | 382/131 |
| 2013/0107003 A1 * | 5/2013 | Lim | G06T 13/40 |
| | | | 348/46 |
| 2015/0110373 A1 * | 4/2015 | Shaham | G06T 7/344 |
| | | | 382/131 |
| 2019/0026942 A1 * | 1/2019 | Zhang | G06T 15/205 |
| 2019/0108679 A1 * | 4/2019 | Wang | G06T 7/344 |
| 2019/0392626 A1 * | 12/2019 | Black | G06T 7/75 |

(Continued)

*Primary Examiner* — Sultana M Zalalee

(74) *Attorney, Agent, or Firm* — Haverstock & Owens, A Law Corporation

(57)　　　　　　ABSTRACT

Parts-based blendshape generation involves establishing a 4D capture sequence. A face, hands and legs are able to be established for the meshes using a template to generate tracked and templated meshes. Specific muscle deformations are extracted. Pose-specific spatial deformations are integrated into a pose to generate specific flesh deformations. A muscle deformation method enables muscle part-based approach deformation (e.g., just biceps if flexing arms). The muscle deformation also enables generating a novel pose not captured.

18 Claims, 5 Drawing Sheets

(56)         References Cited

U.S. PATENT DOCUMENTS

| | | | |
|---|---|---|---|
| 2020/0234481 A1* | 7/2020 | Scapel | A63F 13/213 |
| 2020/0261023 A1* | 8/2020 | Werbin | A61B 5/01 |
| 2021/0150810 A1* | 5/2021 | Cong | G06T 7/246 |
| 2021/0174543 A1* | 6/2021 | Claessen | G06T 7/344 |
| 2021/0304478 A1* | 9/2021 | Tashiro | G06N 20/00 |
| 2022/0005249 A1* | 1/2022 | Choi | G06T 13/40 |
| 2022/0079510 A1* | 3/2022 | Robillard | G16H 20/30 |
| 2022/0383578 A1* | 12/2022 | Kennewick, Sr. | G06T 7/20 |

* cited by examiner

PARTS-BASED DECOMPOSITION OF HUMAN BODY FOR BLEND SHAPE PIPELINE INTEGRATION AND MUSCLE PRIOR CREATION

CROSS-REFERENCE TO RELATED APPLICATION(S)

This application claims priority under 35 U.S.C. § 119(e) of the U.S. Provisional Patent Application Ser. No. 63/493, 391, filed Mar. 31, 2023 and titled, "PARTS-BASED DECOMPOSITION OF HUMAN BODY FOR BLEND SHAPE PIPELINE INTEGRATION AND MUSCLE PRIOR CREATION," which is hereby incorporated by reference in its entirety for all purposes.

FIELD OF THE INVENTION

The present invention relates to three dimensional computer vision and graphics for the entertainment industry. More specifically, the present invention relates to acquiring and processing three dimensional computer vision and graphics for film, TV, music and game content creation.

BACKGROUND OF THE INVENTION

Virtual human creation is highly manual, time-consuming and expensive. Rather than hand-crafting Computer Graphics (CG) artwork from scratch, the recent trend is to efficiently create realistic digital human model by multi-view camera 3D/4D scanners. Various 3D scanner studios (3Lateral, Avatta, TEN24, Pixel Light Effect, Eisko) and 4D scanner studio (4DViews, Microsoft, 8i, DGene) exist world-wide for camera captured based human digitization.

A photo-based 3D scanner studio includes multiple array of high resolution photography cameras. The prior art of 3D scan typically is used to create rigged modeling and requires hand-crafting for animation as it does not capture deformation. A video based 4D scanner (4D=3D+time) studio includes multiple arrays of high frame rate machine vision cameras. It captures natural surface dynamics, but due to fixed videos and actions, it cannot create novel face expression or body action. Dummy actors need to perform many sequences of actions, meaning a huge workload for the actor.

Movie/game studios with conventional CG pipeline (non-neural workflows) use shapes from either 3D scans as reference or manual handcrafting (sculpting) for blend shape workflow (either corrective shapes or pose space deformation). This is time and cost inefficient as there is a manual process involved.

SUMMARY OF THE INVENTION

A muscle deformation method enables muscle part-based approach deformation (e.g., just biceps if flexing arms). The muscle deformation also enables generating a novel pose not captured.

In one aspect, a method programmed in a non-transitory of a device comprises acquiring 4D scanned Range of Motion (ROM) shapes, tracking the ROM shapes and performing a deformation transfer specific to a pose based on vertex correspondences. A base shape is segmented, and the ROM shapes are tracked to the semantically segmented base shape. A desired base shape is used for tracking, and the resulting tracked ROM shapes are semantically segmented. The vertex correspondences are based on muscle groupings.

In another aspect, an apparatus comprises a non-transitory memory for storing an application, the application for: acquiring 4D scanned Range of Motion (ROM) shapes, tracking the ROM shapes and performing a deformation transfer specific to a pose based on vertex correspondences and a processor coupled to the memory, the processor configured for processing the application. A base shape is segmented, and the ROM shapes are tracked to the semantically segmented base shape. A desired base shape is used for tracking, and the resulting tracked ROM shapes are semantically segmented. The vertex correspondences are based on muscle groupings.

In another aspect, a system comprises a volumetric capture system for 3D and 4D scanning including capturing photos and video simultaneously, wherein the 3D scanning and 4D scanning includes detecting muscle deformation of an actor and a computing device configured for: acquiring 4D scanned Range of Motion (ROM) shapes, tracking the ROM shapes and performing a deformation transfer specific to a pose based on vertex correspondences. A base shape is segmented, and the ROM shapes are tracked to the semantically segmented base shape. A desired base shape is used for tracking, and the resulting tracked ROM shapes are semantically segmented. The vertex correspondences are based on muscle groupings.

In another aspect, a method programmed in a non-transitory of a device comprises acquiring a rest pose including a mesh sequence, acquiring tracked Range of Motion (ROM) shapes including the mesh sequence, implementing semantic segmentation by categorizing aspects of the mesh sequence into a class, voxelizing the mesh sequence, extracting a volume of a muscle segment from the voxelized mesh sequence, deforming the muscle segment and generating a new pose with the muscle deformation. Deforming the muscle is performed by a physical simulator. The volume is computed by determining edges of the muscle segment and then calculating the volume within the edges.

In another aspect, an apparatus comprises a non-transitory memory for storing an application, the application for: acquiring a rest pose including a mesh sequence, acquiring tracked Range of Motion (ROM) shapes including the mesh sequence, implementing semantic segmentation by categorizing aspects of the mesh sequence into a class, voxelizing the mesh sequence, extracting a volume of a muscle segment from the voxelized mesh sequence, deforming the muscle segment and generating a new pose with the muscle deformation and a processor coupled to the memory, the processor configured for processing the application. Deforming the muscle is performed by a physical simulator. The volume is computed by determining edges of the muscle segment and then calculating the volume within the edges.

In another aspect, a system comprises a volumetric capture system for 3D and 4D scanning including capturing photos and video simultaneously, wherein the 3D scanning and 4D scanning includes detecting muscle deformation of an actor and a computing device configured for: acquiring a rest pose including a mesh sequence, acquiring tracked Range of Motion (ROM) shapes including the mesh sequence, implementing semantic segmentation by categorizing aspects of the mesh sequence into a class, voxelizing the mesh sequence, extracting a volume of a muscle segment from the voxelized mesh sequence, deforming the muscle segment and generating a new pose with the muscle deformation. Deforming the muscle is performed by a physical simulator. The volume is computed by determining edges of the muscle segment and then calculating the volume within the edges.

DETAILED DESCRIPTION OF THE PREFERRED EMBODIMENT

Figure 1:
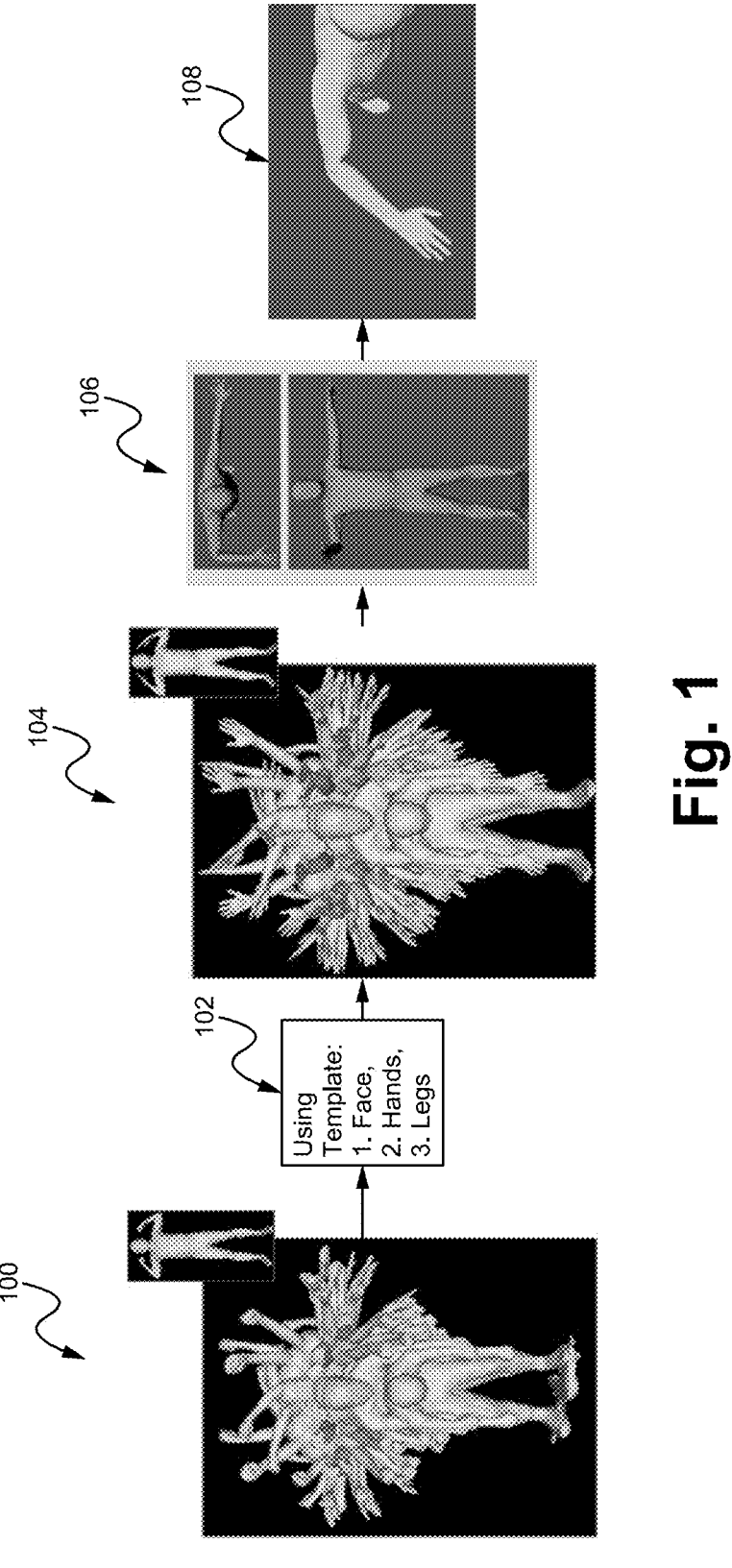
FIG. 1 illustrates a diagram of parts-based decomposition for AutoBACS according to some embodiments.

A 4D based workflow for generating shapes for integration in a CG pipeline or workflow without any major changes is described herein.

Tracked meshes of a body have common topology but they exhibit issues that could make it not directly useable in CG pose-space deformation or joint-based workflows: uneven hand or foot shape between frame to frame; facial expression changes due to muscle posing; deformation in other locations of the body where it is undesirable; each deformed pose is non-semantic, meaning information where exact deformation is happening unless there are specific references to original input pose; and tracked mesh regardless of tracking error will have motion in undesired locations of the human body due to subject movement when flexing muscles.

Using a video capture system, a mesh is able to be generated at each frame. Given a time, a mesh is able to be generated by capturing the images and a 3D model is able to be generated at each frame. The 3D model is comprised of many triangles or quads, and the positions of the primitives varies at each time frame. Mesh tracking is implemented such that each mesh has the same topology (e.g., triangle at the same position, the same triangle count, and all the properties of the mesh should be the same) across a sequence.

Based on mesh tracking, although a target area deforms, there is generally also a deformation in another part of the body (e.g., because humans do not maintain good posture). A targeted deformation is able to be implemented such that other parts of the body are not deformed. Given a sequence, the sequence is tracked using a template model which has muscle groups (e.g., biceps group, shoulder muscle group, triceps group). A new mesh is generated with only deformation at one muscle group (e.g., when going from a t-pose to a flexed arm pose, the only deformation is at the biceps group). This overcomes the inherent problems of tracking and capturing poses in general. A method to generate a blendshape by using a muscle part-based approach is described herein. The muscle information is able to be captured based on muscle range of motion as described in U.S. patent application Ser. No. 17/706,996, filed Mar. 29, 2022, titled, AUTOMATIC BLENDING OF HUMAN FACIAL EXPRESSION AND FULL-BODY POSES FOR DYNAMIC DIGITAL HUMAN MODEL CREATION USING INTEGRATED PHOTO-VIDEO VOLUMETRIC CAPTURE SYSTEM AND MESH-TRACKING, which is based on photo-video capture from a "photo-video volumetric capture system." Photo-video based capture is described in PCT Patent Application PCT/US2019/068151, filed Dec. 20, 2019 titled, PHOTO-VIDEO BASED SPATIAL-TEMPORAL VOLUMETRIC CAPTURE SYSTEM FOR DYNAMIC 4D HUMAN FACE AND BODY DIGITIZATION, which are both hereby incorporated by reference in their entireties for all purposes. As described, the photo-video capture system is able to capture high fidelity texture in sparse time, and between the photo captures, video is captured, and the video is able to be used to establish the correspondence (e.g., transition) between the sparse photos. The correspondence information is able to be used to implement mesh tracking.

It is able to be determined or known at which pose, which muscle will be deformed. For example, it is able to be known that a specific key frame has a specific muscle deformation, so it is able to be correlated that a specific muscle actuation occurs with a specific pose. Furthering the example, if a movement suggests that a biceps muscle is deformed, then only the biceps muscle will be deformed.

It is possible to simulate muscle inside a mesh using a skeletal system; however, that is a very artist-intensive process. Instead, by capturing various poses (e.g., t-pose and flexed arm pose), the volume of each specific muscle (e.g., biceps) is able to be determined. With the volume of the muscle, given a parametric human muscle model, parameters are able to be populated using the mesh sequences. This is able to be used to generate a new pose.

FIG. 1 illustrates a diagram of parts-based decomposition for AutoBACS according to some embodiments. In the step 100, a 4D capture sequence is established. For example, many frames with a mesh in a variety of positions or poses are captured or received. In the step 102, face, hands and legs are able to be established for the meshes using a template to generate tracked and templated meshes 104. For example, the hand orientations, facial expressions, and leg orientations are used to generate a unified sequence. In the step 106, specific muscle deformations (e.g., biceps) are extracted. In other words, specific blendshapes of parts are extracted. In the step 108, space deformations are integrated into a pose to generate specific flesh deformations. The parts-based pose space deformation technology is able to be fit into any generic computer graphics artist workflow. In some embodiments, fewer or additional steps are implemented. In some embodiments, the order of the steps are modified.

Figure 2:
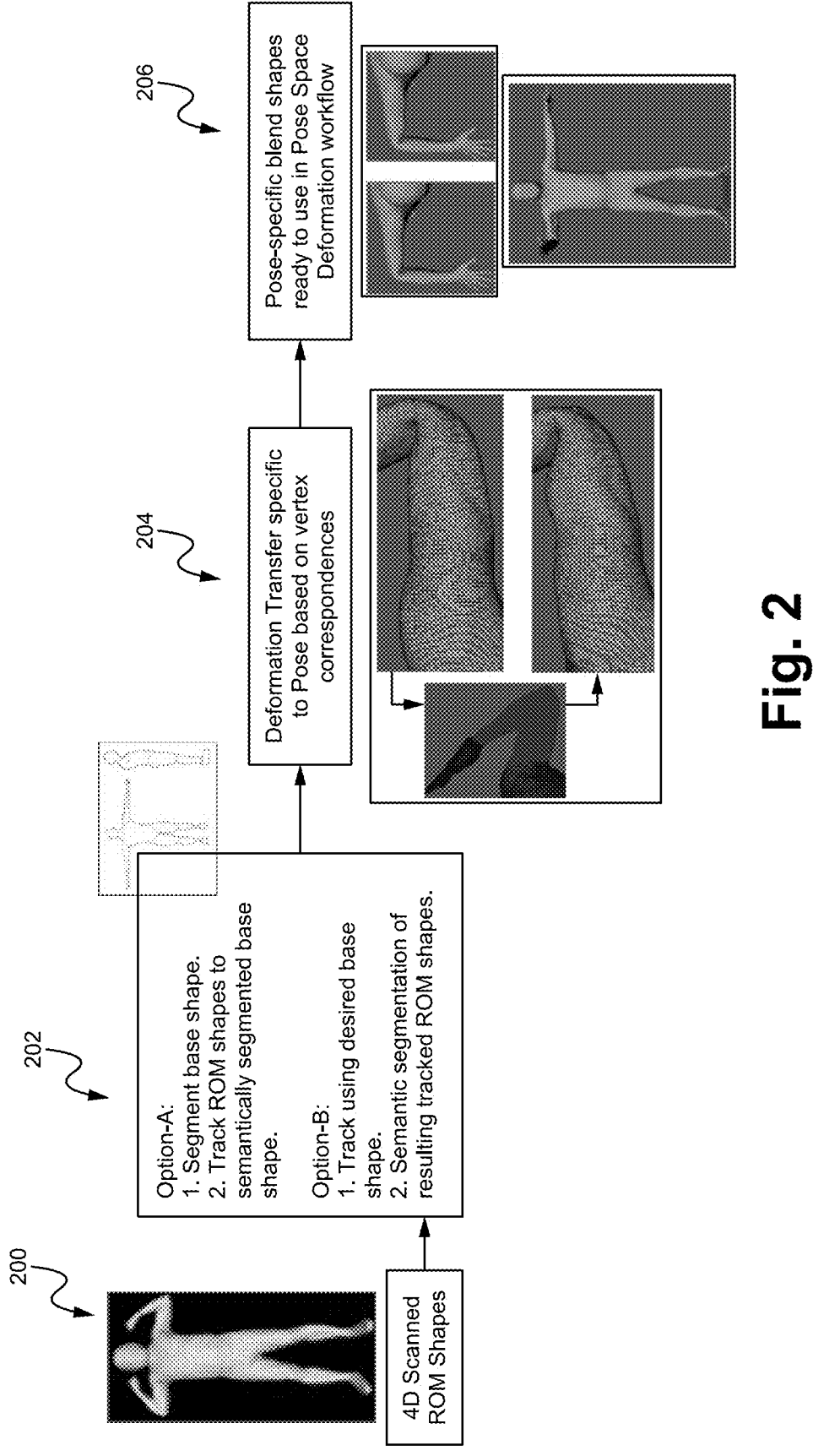
FIG. 2 illustrates a flowchart of parts-based decomposition for AutoBACS according to some embodiments.

FIG. 2 illustrates a flowchart of parts-based decomposition for AutoBACS according to some embodiments. In the step 200, 4D scanned Range of Motion (ROM) shapes are acquired or captured as described herein. In the step 202, tracking is implemented. In some embodiments, there are multiple options for tracking. In one option, a base shape is segmented, and ROM shapes are tracked to the semantically segmented base shape. In another option, a desired base shape is used to track, and the resulting tracked ROM shapes are semantically segmented.

In the step 204, a deformation transfer specific to a pose based on vertex correspondences is performed. The deformation transfer applies a deformation of a part of the source mesh (e.g., triangle mesh) onto a part of a different mesh. Pose-specific blendshapes 206 are ready to use in a pose space deformation workflow. Inconsistencies between meshes in the tracked keyframes are able to be removed after 4D capture by using templated body parts and removing deformations in non-desired parts of a scanned subject for isolation purposes to generate semantic meshes (e.g., blendshapes) with meaningful deformation that is able to be mapped to the skeleton joints directly for learning body part deformations. The mapping is achieved due to the previous capture of range of motion based on muscles.

There are several muscle groupings based on a vertex:

Upper arm: this segment includes the deltoid, biceps, and triceps muscles. The vertices corresponding to this segment are in the upper arm area, between the shoulder joints.

Forearm: This segment includes the forearm muscles, such as the brachioradialis and flexor carpi ulnaris. The vertices corresponding to this segment are in the lower arm area, between the elbow and wrist joints.

Hand: This segment includes the hand muscles, such as the muscles of the fingers and palm. The vertices corresponding to this segment are in the hand area, including the fingers and palm.

Thigh: This segment includes the quadriceps and hamstring muscles. The vertices corresponding to this segment are in the upper leg area, between the hip and knee joints.

Lower leg: This segment includes the calf muscles, such as the gastronemius and soleus. The vertices corresponding to this segment are in the lower leg area, between the knee and ankle joints.

Foot: This segment includes the foot muscles, such as the muscles of the toes and sole. The vertices correspond to this segment are in the foot area, including the toes and sole.

Torso: This segment includes the core muscles, such as the rectus abdominis and erector spinae. The vertices corresponding to this segment are in the torso area, including the abdomen and back. In some embodiments, fewer or additional steps are implemented. In some embodiments, the order of the steps are modified.

Figure 3:
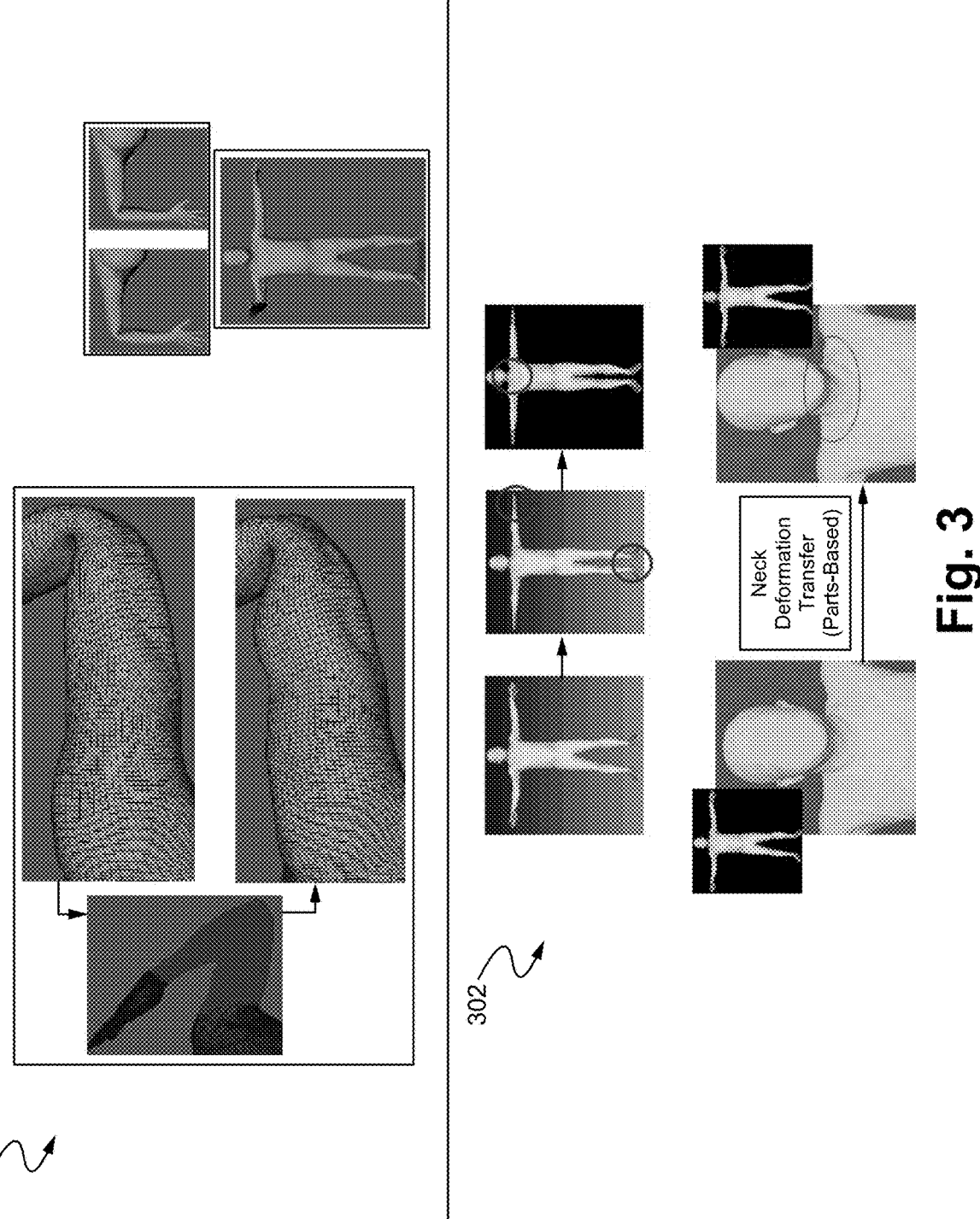
FIG. 3 illustrates diagrams of an application to a full body blend shape workflow and a corrective workflow according to some embodiments.

FIG. 3 illustrates diagrams of an application to a full body blend shape workflow and a corrective workflow according to some embodiments. A pose-space deformation workflow 300 is shown. A corrective blend shape workflow 302 is also shown. For example, if a person moves a different body part when changing from one pose to another pose, the corrective blend shape workflow is able to correct that movement. Furthering the example, when a person moves to a t-pose, the person may be inclined to push their head and neck forward. With the corrective blend shape workflow, the head and neck are able to be corrected to maintain a more upright and not pushed forward position of the head.

Figure 4:
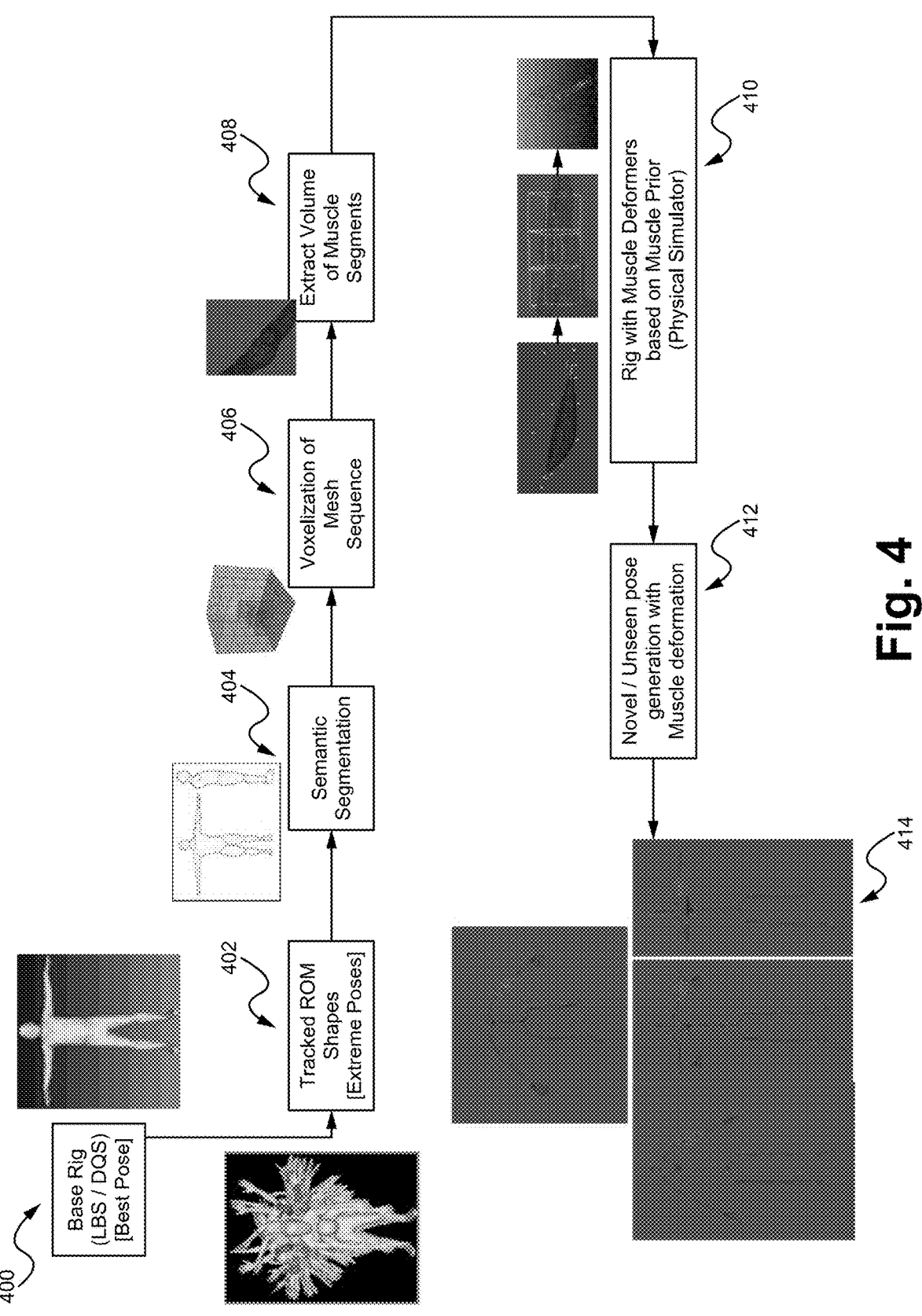
FIG. 4 illustrates a flowchart of a muscle deformer as a physical simulator for deformation according to some embodiments.

FIG. 4 illustrates a flowchart of a muscle deformer as a physical simulator for deformation according to some embodiments. In the step 400, a base rig (e.g., rest pose) is acquired or captured. In the step 402, tracked ROM shapes (e.g., extreme poses) are acquired or captured. The base rig and the tracked ROM shapes establish a mesh sequence. Mesh creation/generation is implemented using the integrated volumetric photo-video system. The mesh generation includes extreme pose modeling and registration for blending. An integrated photo-video volumetric capture system for 3D/4D scan acquires 3D scans and 4D scans by acquiring images and videos of a subject/actor simultaneously. The 3D scans are able to be used to generate auto high-fidelity extreme poses, and the 4D scans include high temporal resolution which enables mesh tracking to automatically register extreme pose meshes for blending.

In the step 404, semantic segmentation is implemented on the mesh sequence. Semantic segmentation involves categorizing aspects of a mesh sequence into a class or an object. In the step 406, the mesh sequence is voxelized. Any implementation is able to be used to transform the mesh sequence into voxels. In the step 408, a volume of each muscle segment is extracted from the voxelized mesh sequence. The volume is able to be computed in any manner such as by determining the edges of the muscle segment and then calculating the volume within the edges. In the step 410, a physical simulator is used to deform the muscle based on a prior muscle. In the step 412, a novel, unseen pose is generated with muscle deformation. Image 414 shows the novel, unseen pose with muscle deformation. In some embodiments, fewer or additional steps are implemented. In some embodiments, the order of the steps is modified.

Figure 5:
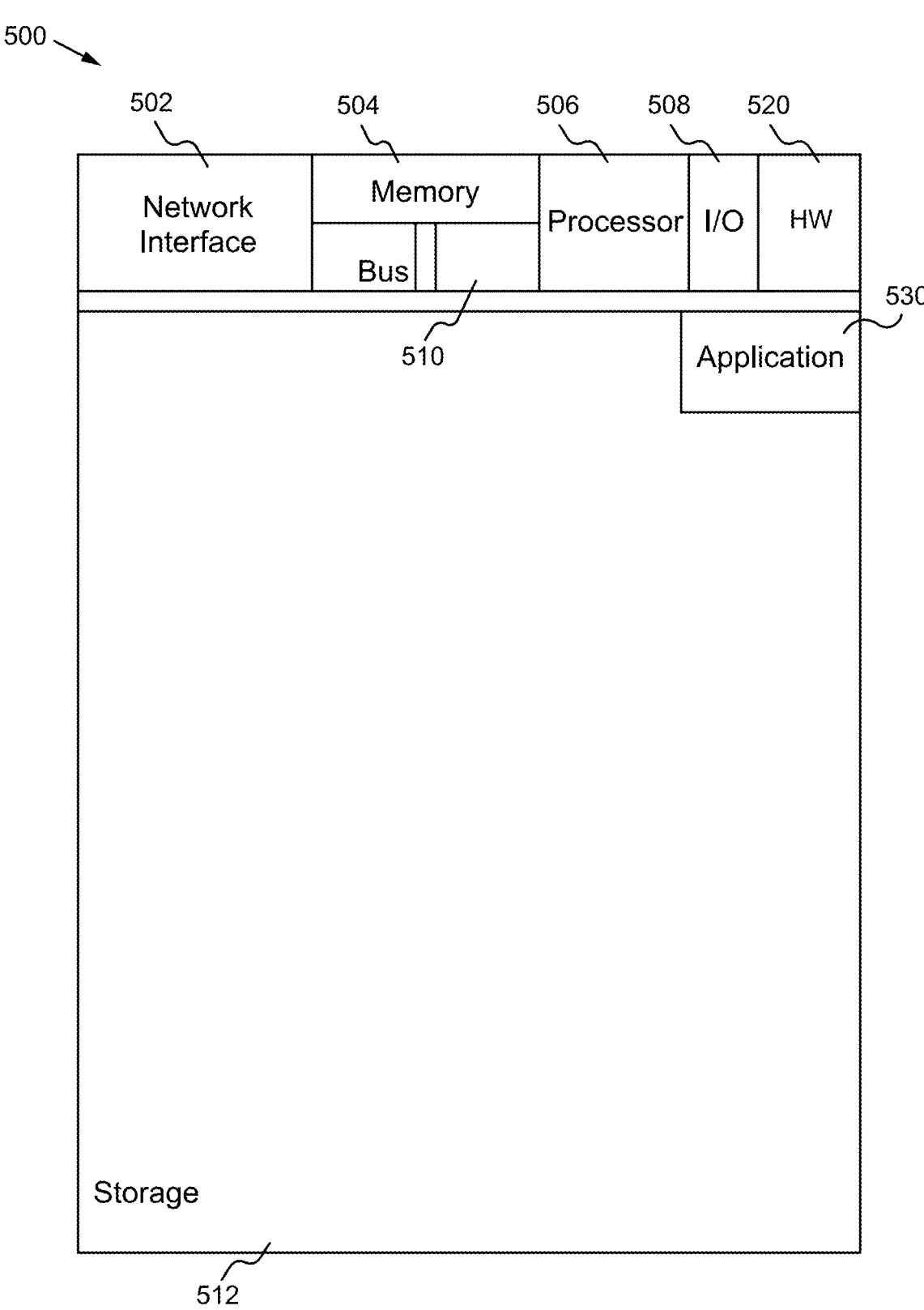
FIG. 5 illustrates a block diagram of an exemplary computing device configured to implement the muscle deformation method according to some embodiments.

FIG. 5 illustrates a block diagram of an exemplary computing device configured to implement the muscle deformation method according to some embodiments. The computing device 500 is able to be used to acquire, store, compute, process, communicate and/or display information such as images and videos. The computing device 500 is able to implement any of the muscle deformation aspects. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Muscle deformation application(s) 530 used to implement the muscle deformation method are likely to be stored in the storage device 512 and memory 504 and processed as applications are typically processed. More or fewer components shown in FIG. 5 are able to be included in the computing device 500. In some embodiments, muscle deformation hardware 520 is included. Although the computing device 500 in FIG. 5 includes applications 530 and hardware 520 for the muscle deformation method, the muscle deformation method is able to be implemented on a computing device in hardware, firmware, software or any combination thereof. For example, in some embodiments, the muscle deformation applications 530 are programmed in a memory and executed using a processor. In another example, in some embodiments, the muscle deformation hardware 520 is programmed hardware logic including gates specifically designed to implement the muscle deformation method.

In some embodiments, the muscle deformation application(s) 530 include several applications and/or modules. In some embodiments, modules include one or more submodules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the muscle deformation method described herein, devices such as digital cameras/camcorders/computers are used to acquire content and then the same devices or one or more additional devices analyze the content. The muscle deformation method is able to be implemented with user assistance or automatically without user involvement to perform muscle deformation.

In operation, the muscle deformation method enables muscle part-based approach deformation (e.g., just biceps if flexing arms). The muscle deformation also enables generating a novel pose not captured.

SOME EMBODIMENTS OF PARTS-BASED DECOMPOSITION OF HUMAN BODY FOR BLEND SHAPE PIPELINE INTEGRATION AND MUSCLE PRIOR CREATION

1. A method programmed in a non-transitory of a device comprising:
   acquiring 4D scanned Range of Motion (ROM) shapes;
   tracking the ROM shapes; and
   performing a deformation transfer specific to a pose based on vertex correspondences.
2. The method of clause 1 wherein a base shape is segmented, and the ROM shapes are tracked to the semantically segmented base shape.
3. The method of clause 1 wherein a desired base shape is used for tracking, and the resulting tracked ROM shapes are semantically segmented.
4. The method of clause 1 wherein the vertex correspondences are based on muscle groupings.
5. An apparatus comprising:
   a non-transitory memory for storing an application, the application for:
     acquiring 4D scanned Range of Motion (ROM) shapes;
     tracking the ROM shapes; and
     performing a deformation transfer specific to a pose based on vertex correspondences; and
   a processor coupled to the memory, the processor configured for processing the application.
6. The apparatus of clause 5 wherein a base shape is segmented, and the ROM shapes are tracked to the semantically segmented base shape.
7. The apparatus of clause 5 wherein a desired base shape is used for tracking, and the resulting tracked ROM shapes are semantically segmented.
8. The apparatus of clause 5 wherein the vertex correspondences are based on muscle groupings.
9. A system comprising:
   a volumetric capture system for 3D and 4D scanning including capturing photos and video simultaneously, wherein the 3D scanning and 4D scanning includes detecting muscle deformation of an actor; and
   a computing device configured for:
     acquiring 4D scanned Range of Motion (ROM) shapes;
     tracking the ROM shapes; and
     performing a deformation transfer specific to a pose based on vertex correspondences.
10. The system of clause 9 wherein a base shape is segmented, and the ROM shapes are tracked to the semantically segmented base shape.

11. The system of clause 9 wherein a desired base shape is used for tracking, and the resulting tracked ROM shapes are semantically segmented.
12. The system of clause 9 wherein the vertex correspondences are based on muscle groupings.
13. A method programmed in a non-transitory of a device comprising:
   acquiring a rest pose including a mesh sequence;
   acquiring tracked Range of Motion (ROM) shapes including the mesh sequence;
   implementing semantic segmentation by categorizing aspects of the mesh sequence into a class;
   voxelizing the mesh sequence;
   extracting a volume of a muscle segment from the voxelized mesh sequence;
   deforming the muscle segment; and generating a new pose with the muscle deformation.
14. The method of clause 13 wherein deforming the muscle is performed by a physical simulator.
15. The method of clause 13 wherein the volume is computed by determining edges of the muscle segment and then calculating the volume within the edges.
16. An apparatus comprising:
   a non-transitory memory for storing an application, the application for:
     acquiring a rest pose including a mesh sequence;
     acquiring tracked Range of Motion (ROM) shapes including the mesh sequence;
     implementing semantic segmentation by categorizing aspects of the mesh sequence into a class;
     voxelizing the mesh sequence;
     extracting a volume of a muscle segment from the voxelized mesh sequence;
     deforming the muscle segment; and
     generating a new pose with the muscle deformation; and
   a processor coupled to the memory, the processor configured for processing the application.
17. The apparatus of clause 16 wherein deforming the muscle is performed by a physical simulator.
18. The apparatus of clause 16 wherein the volume is computed by determining edges of the muscle segment and then calculating the volume within the edges.
19. A system comprising:
   a volumetric capture system for 3D and 4D scanning including capturing photos and video simultaneously, wherein the 3D scanning and 4D scanning includes detecting muscle deformation of an actor; and
   a computing device configured for:
     acquiring a rest pose including a mesh sequence;
     acquiring tracked Range of Motion (ROM) shapes including the mesh sequence;
     implementing semantic segmentation by categorizing aspects of the mesh sequence into a class;
     voxelizing the mesh sequence;
     extracting a volume of a muscle segment from the voxelized mesh sequence;
     deforming the muscle segment; and generating a new pose with the muscle deformation.
20. The system of clause 19 wherein deforming the muscle is performed by a physical simulator.
21. The system of clause 19 wherein the volume is computed by determining edges of the muscle segment and then calculating the volume within the edges.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory of a device comprising:

acquiring 4D scanned Range of Motion (ROM) shapes;

tracking the ROM shapes; and performing a deformation transfer specific to a pose based on vertex correspondences, wherein the vertex correspondences are based on muscle groupings, wherein one or more inconsistencies between meshes in tracked keyframes are removed after acquiring the ROM shapes by using templated body parts and removing one or more deformations in non-desired parts to generate a semantic mesh with deformation mapped to skeleton joints directly for learning body part deformations, wherein mapping is based on a previous capture of range of motion of muscles.

2. The method of claim 1 wherein a base shape is segmented, and the ROM shapes are tracked to the segmented base shape.

3. The method of claim 1 wherein a desired base shape is used for tracking, and the resulting tracked ROM shapes are semantically segmented.

4. An apparatus comprising:

a non-transitory memory for storing an application, the application for:

acquiring 4D scanned Range of Motion (ROM) shapes;

tracking the ROM shapes; and performing a deformation transfer specific to a pose based on vertex correspondences, wherein the vertex correspondences are based on muscle groupings, wherein one or more inconsistencies between meshes in tracked keyframes are removed after acquiring the ROM shapes by using templated body parts and removing one or more deformations in non-desired parts to generate a semantic mesh with deformation mapped to skeleton joints directly for learning body part deformations, wherein mapping is based on a previous capture of range of motion of muscles; and a processor coupled to the memory, the processor configured for processing the application.

5. The apparatus of claim 4 wherein a base shape is segmented, and the ROM shapes are tracked to the segmented base shape.

6. The apparatus of claim 4 wherein a desired base shape is used for tracking, and the resulting tracked ROM shapes are semantically segmented.

7. A system comprising:

a volumetric capture system for 3D and 4D scanning including capturing photos and video simultaneously, wherein the 3D scanning and 4D scanning includes detecting muscle deformation of an actor; and a computing device configured for:

acquiring 4D scanned Range of Motion (ROM) shapes;

tracking the ROM shapes; and performing a deformation transfer specific to a pose based on vertex correspondences, wherein the vertex correspondences are based on muscle groupings, wherein one or more inconsistencies between meshes in tracked keyframes are removed after acquiring the ROM shapes by using templated body parts and removing one or more deformations in non-desired parts to generate a semantic mesh with deformation mapped to skeleton joints directly for learning body part deformations, wherein mapping is based on a previous capture of range of motion of muscles.

8. The system of claim 7 wherein a base shape is segmented, and the ROM shapes are tracked to the segmented base shape.

9. The system of claim 7 wherein a desired base shape is used for tracking, and the resulting tracked ROM shapes are semantically segmented.

10. A method programmed in a non-transitory of a device comprising:

acquiring a rest pose including a mesh sequence including pose modeling and registration for blending, wherein the mesh sequence is acquired using an integrated photo-video volumetric capture system for 3D/4D scans by acquiring images and videos of a subject simultaneously;

acquiring tracked Range of Motion (ROM) shapes including the mesh sequence;

implementing semantic segmentation by categorizing aspects of the mesh sequence into a class;

voxelizing the mesh sequence;

extracting a volume of a muscle segment from the voxelized mesh sequence;

deforming the muscle segment; and generating a new pose with the muscle deformation.

11. The method of claim 10 wherein deforming the muscle is performed by a physical simulator.

12. The method of claim 10 wherein the volume is computed by determining edges of the muscle segment and then calculating the volume within the edges.

13. An apparatus comprising:

a non-transitory memory for storing an application, the application for:

acquiring a rest pose including a mesh sequence including pose modeling and registration for blending, wherein the mesh sequence is acquired using an integrated photo-video volumetric capture system for 3D/4D scans by acquiring images and videos of a subject simultaneously;

acquiring tracked Range of Motion (ROM) shapes including the mesh sequence;

implementing semantic segmentation by categorizing aspects of the mesh sequence into a class;

voxelizing the mesh sequence;

extracting a volume of a muscle segment from the voxelized mesh sequence;

deforming the muscle segment; and generating a new pose with the muscle deformation; and a processor coupled to the memory, the processor configured for processing the application.

14. The apparatus of claim 13 wherein deforming the muscle is performed by a physical simulator.

15. The apparatus of claim 13 wherein the volume is computed by determining edges of the muscle segment and then calculating the volume within the edges.

16. A system comprising:

a volumetric capture system for 3D and 4D scanning including capturing photos and video simultaneously, wherein the 3D scanning and 4D scanning includes detecting muscle deformation of an actor; and a computing device configured for:

acquiring a rest pose including a mesh sequence includ-
ing pose modeling and registration for blending,
wherein the mesh sequence is acquired using an
integrated photo-video volumetric capture system
for 3D/4D scans by acquiring images and videos of
a subject simultaneously;

acquiring tracked Range of Motion (ROM) shapes
including the mesh sequence;

implementing semantic segmentation by categorizing aspects of the mesh sequence into a class;

voxelizing the mesh sequence;

extracting a volume of a muscle segment from the
voxelized mesh sequence;

deforming the muscle segment; and generating a new pose with the muscle deformation.

17. The system of claim 16 wherein deforming the muscle
is performed by a physical simulator.

18. The system of claim 16 wherein the volume is
computed by determining edges of the muscle segment and
then calculating the volume within the edges.

\* \* \* \* \*